United States Patent [19]

Seiffarth et al.

[11] Patent Number: 5,271,029
[45] Date of Patent: Dec. 14, 1993

[54] WAVEGUIDE LASER FOR USE AT HIGH LASER POWER

[75] Inventors: Werner Seiffarth, Bad Aibling; Hans Krueger, Munich, both of Fed. Rep. of Germany

[73] Assignee: Siemens Aktiengesellschaft, Munich, Fed. Rep. of Germany

[21] Appl. No.: 916,030

[22] Filed: Jul. 17, 1992

[30] Foreign Application Priority Data

Jul. 18, 1991 [DE] Fed. Rep. of Germany ....... 4123899

[51] Int. Cl.$^5$ .............................................. H01S 3/03
[52] U.S. Cl. ....................................... 372/64; 372/92; 372/98; 372/95
[58] Field of Search .................. 372/64, 61, 92, 98, 372/65, 62, 95

[56] References Cited

U.S. PATENT DOCUMENTS

| | | | |
|---|---|---|---|
| 4,751,715 | 6/1988 | Henderson | 372/64 |
| 4,807,232 | 2/1989 | Hart et al. | 372/64 |
| 5,048,048 | 9/1991 | Nishimae et al. | 372/64 |

*Primary Examiner*—Leon Scott, Jr.
*Attorney, Agent, or Firm*—Hill, Steadman & Simpson

[57] ABSTRACT

A waveguide laser having a pair of electrodes mounted opposite one another in the gas discharge space is provided with a spacer extending between the two electrodes. The spacer prevents movement of the electrodes from a mutually parallel position which may otherwise occur due to mechanical stresses in the laser. Beam quality is thereby maintained. The spacer has only a limited extent in the direction transverse to beam travel and/or is of a material transmissive to laser light to prevent detrimental effects on the laser. The spacer is particularly useful in $CO_2$ lasers, such as pulsed lasers.

17 Claims, 1 Drawing Sheet

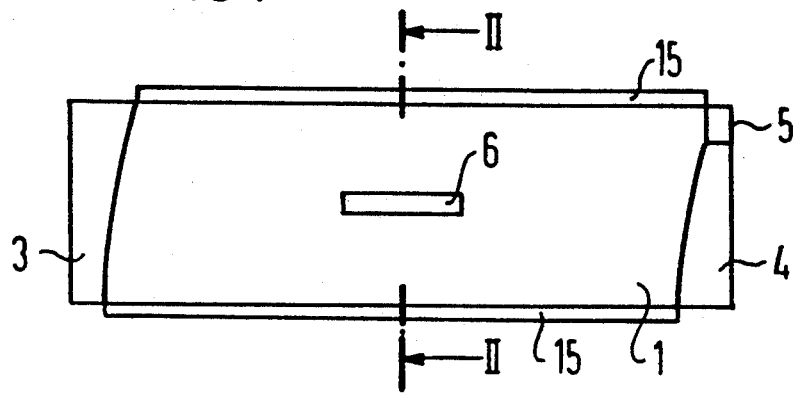
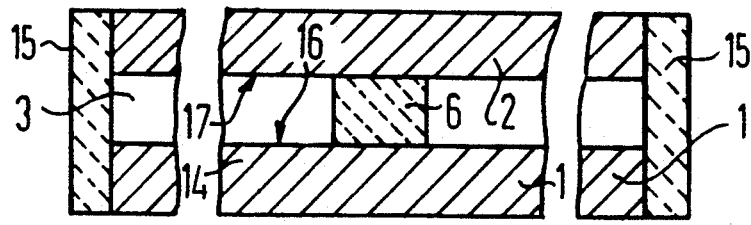
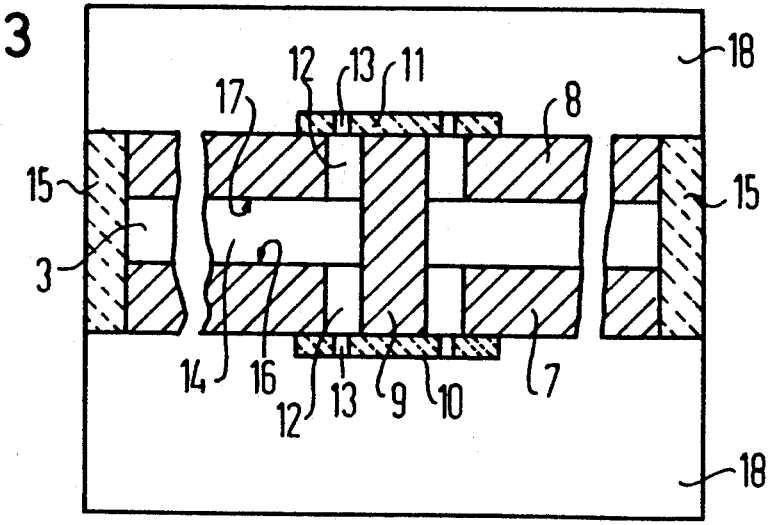

WAVEGUIDE LASER FOR USE AT HIGH LASER POWER

BACKGROUND OF THE INVENTION

1. Field of the Invention

The present invention is directed generally to a stripline or waveguide laser having a pair of electrodes lying opposite one another at a constant spacing between which is a gas discharge space, the electrodes forming waveguide surfaces.

2. Description of the Related Art

A waveguide, or stripline, laser is disclosed in German Published Application 37 29 053. This laser finds particular applicability as a $CO_2$ laser.

SUMMARY OF THE INVENTION

An object of the present invention is to enhance laser power obtainable with a waveguide or stripline laser while retaining high quality of the emitted laser beam and, at the same time, keeping structural outlay low and cost expenditure low.

To achieve high laser beam quality, optimum power output, and a consistency of the laser power over time, even with pulsed operation of the laser, it is necessary to have an extremely precise parallel alignment of the two electrode surfaces of the waveguide laser. There should be no variations from parallel exceeding, for example, approximately 0.01 mm for lasers capable of 200 watts of output power. Such high alignment precision must also be preserved even during pressure fluctuations within the gas charge space that occur when lasers are driven in a pulsed operation. Otherwise, variations from parallel in the waveguide surfaces leads to a deterioration of the beam quality due to the excitation of other longitudinal modes, which have a particularly negative influence on the focusability of the laser beam. A reduction in the laser power should be avoided insofar as possible.

These and other objects and advantages of the invention are achieved by a spacer of high impedance material being positioned between the two electrodes of the laser. Preferably, the spacer occupies only a small portion of the volume of the laser discharge channel and is of a shape and material selected so that the intensity and the quality of the laser beam are not detrimentally influenced.

Accordingly to one perception which underlies the invention, a spacer in the discharge channel does not have a disturbing effect on the laser beam when it has only a slight transverse expanse relative to the direction of the laser light and/or when the spacer is composed of a material which is transmissive for the laser light. Ideally, the width of the spacer should amount to only up to approximately 10 percent of the width of the laser-active gas discharge space. When applied in a $CO_2$ laser, the present invention provides particular advantages when the spacer is composed of Si, Ge, GeAs, or ZnSe, since these materials are transmissive for the laser emission of the $CO_2$ laser at 10.6 $\mu$m.

The spacer need not be transmissive for the laser light when its expanse in a direction transverse to the beam direction is especially narrow and, in particular, when it does not exceed 2 percent of the width of the laser active gas discharge space.

The spacer is preferably arranged in the region of the surface center of gravity of the electrodes. This provides an optimum damping of oscillations and resonant effects on the electrodes which can occur during pulsed operation of the laser. Of course, when more than one spacer is used, other placement of the spacers are possible.

Due to its higher dielectric constant relative to the plasma, the spacer as described in the foregoing fundamentally leads to an exaltation, or increase, in the field strength in the proximity of the spacer. The field strength increase must be reduced or avoided to fully exploit the laser power which may be obtained from the laser. To this end, the electrodes are preferably provided with recesses and the spacers are secured in the recesses so that a gap is present between the spacer and the respective electrodes in region of the waveguide surfaces of the electrodes. Another preferred development provides that the electrodes are provided with through openings and these through openings are at least partially closed by terminating plates which are applied on the surfaces facing away from the gas discharge gap, and further, that the spacer is supported against these terminating plates. The field strength increase in the vicinity of the spacer is thereby avoided. The field strength increase in the vicinity of the spacer is thereby avoided. Additionally, oscillations due to acoustic resonances in the gas discharge space are attenuated or avoided in this embodiment, particularly when the terminating plates have openings and an adjoining gas reservoir is provided. A pressure equalization between the gas discharge space and the gas reservoir can take place, which attenuates the oscillations of the gas situated in the discharge gap.

BRIEF DESCRIPTION OF THE DRAWINGS

The invention shall now be described with reference to three drawing figures.

FIG. 1 is a schematic plan view of a stripline or waveguide laser of the present invention from which an upper electrode has been omitted;

FIG. 2 is a cross-section along lines II—II of FIG. 1 of the laser, shown in partially broken view; and FIG. 3 is a cross-section similar to the view of FIG. 2 showing a second exemplary embodiment of the laser according to the principles of the present invention.

DETAILED DESCRIPTION OF THE PREFERRED EMBODIMENTS

In FIG. 1 is shown a stripline, or waveguide, laser, also termed a ribbon laser, for emitting a high power laser beam. A gas discharge space 14 filled with a laser active gas is defined between side walls 15 of insulating material, for example of ceramic, and by lower and upper electrodes 1 and 2 (the upper electrode 2 being omitted from the view of FIG. 1). The mutual spacing between the two electrodes 1 and 2 must be exactly defined and the electrodes 1 and 2 must be exactly parallel for proper operation of the laser. To preserve the mutual positions of the electrodes 1 and 2, even under operating conditions during which they are subject to temperature fluctuations and mechanical stresses over the entire area of the electrodes 1 and 2, a spacer 6 is preferably arranged in the gas discharge space extending between these electrodes. The spacer 6 is positioned at the surface center of gravity of the electrodes 1 and 2. The ends of the gas discharge space are closed by mirrors 3 and 4 to form an unstable resonator, the mirror 4 being provided with a beam exit window 5 from which the beam is emitted, thereby forming the complete laser.

The surfaces of the electrodes 1 and 2 which face toward the gas discharge space 14 (as shown in FIG. 2) constitute waveguide surfaces 16 and 17 for the laser light. Even slight deviations from the parallel of these surfaces noticeably reduces the laser power that is emitted from the laser. Changes in parallelism of the electrodes 1 and 2 lead to changes in the beam quality. Under alternating stress on the electrodes 1 and 2, intensity fluctuations in the laser power and in the beam quality which are unacceptable in practice arise. These undesirable effects are attenuated and to a large extent cancelled by the addition of the spacer 6. As needed, a plurality of spacers may be provided distributed over the electrode surface.

In a second embodiment as shown in FIG. 3, electrodes 7 and 8 are provided and include recesses 12 which are covered by terminating plates 10 and 11. A spacer 9 is supported between the terminating plates 10 and 11, the spacer 9 being spaced a distance from the electrodes 7 and 8 in the region of the waveguide surfaces 16 and 17. This avoids the field increase, or exaltation, in the region around the spacer 9 which would occur since the dielectric constant in the spacer is fundamentally considerably higher than the adjoining discharge space. Consequently, the second embodiment enables full utilization of the dielectric strength and, thus, maximum energy infeed to the gas discharge space 14. The terminating plates 10 and 11 include openings 13 which discharge into a schematically illustrated gas reservoir 18 and, thus, provide for pressure equalization with the reservoir when, for example, pressure differences arise as a consequence of oscillations in the plasma. Therefore, acoustic resonances, for example, in the plasma are avoided or at least attenuated.

An extremely uniform, undisturbed field distribution and a full utilization of the electrode surface is achieved when the spacer 9 is composed of metal, the terminating plates 10 and 11 are composed of ceramic, and the electrical resistance and electrical capacitance between each of the two electrodes 7 and 8, and the spacer are so close to one another so that the voltage difference occurring at the spacer 9 during operation vis-a-vis each of the two electrodes lies below the plasma maintaining voltage. In this case, the distance between the spacer 9 and the electrodes 7 and 8 can be kept especially small.

Thus, there is shown and described a ribbon, or stripline, or waveguide, laser for high laser power which includes two electrodes that lie opposite one another at a constant spacing and limit a gas discharge space. To maintain precise parallelism between the electrodes even during mechanical stress as the result of operation of the laser, at least one spacer of a high impedance material is arranged between the electrodes. The spacer occupies only a small part of the volume of the gas discharge space and is of a shape and/or material which is selected so that the intensity and quality of the laser beam is not detrimentally influenced. Thus, the quality of the laser beam is maintained.

The present invention provides particular applicability in $CO_2$ waveguide lasers.

Although other modifications and changes may be suggested by those skilled in the art, it is the intention of the inventors to embody within the patent warranted hereon all changes and modifications as reasonably and properly come within the scope of the contribution to the art.

We claim:

1. A waveguide laser for use at high laser power, comprising:
    first and second electrodes lying opposite one another at a constant spacing and defining therebetween a gas discharge space, surfaces adjoining the gas discharge space being waveguide surfaces; and
    at least one spacer of high impedance material arranged between said first and second electrodes, said at least one spacer occupying only a small portion of a volume of the gas discharge space sufficiently small to have little effect on emissions from said laser and thereby preserving a high alignment precision.

2. A waveguide laser as claimed in claim 1, wherein said spacer is of a material transmissive for laser emission.

3. A waveguide laser as claimed in claim 2, wherein said laser is a $CO_2$ laser, and wherein said spacer is of a material selected from the group consisting of Si, Ge, and GaAs.

4. A waveguide laser as claimed in claim 1, wherein said at least one spacer is narrower in a direction transverse to a beam direction than in a direction along the beam direction.

5. A waveguide laser as claimed in claim 4, wherein said at least one spacer is no broader in the direction transverse to the beam direction than 10% of a width of said gas discharge space.

6. A waveguide laser as claimed in claim 1, wherein said first and second electrodes define recesses, said spacer being secured in said recesses so that a distance is defined between said at least one spacer and said first and second electrodes at said waveguide surfaces.

7. A waveguide laser as claimed in claim 6, wherein said recesses extend through said first and second electrodes, and further comprising:
    terminating plates mounted on surfaces of said first and second electrodes to at least partially close said recesses, said spacer being supported on said terminating plates.

8. A waveguide laser as claimed in claim 7, wherein said terminating plates define through openings, and further comprising:
    a gas reservoir in fluid communication with said through openings in said terminating plates.

9. A waveguide laser as claimed in claim 7, wherein said spacer is of a metal, wherein said terminating plates are of a ceramic material, and wherein an electrical resistance and capacitance between each of said first and second electrodes and said spacer are close enough to one another that voltage differences with said first and second electrodes is below a plasma maintaining voltage during operation of said laser.

10. A waveguide as claimed in claim 1, wherein said spacer is approximately at a surface center of gravity of said first and second electrodes.

11. A waveguide laser, comprising:
    a waveguide body defining a channel fillable with a gas to form a gas discharge space;
    first and second electrodes mounted opposite one another within said channel and having electrode surfaces facing said gas discharge space in mutual alignment; and
    a spacer mounted in said gas discharge space and extending between said first and second electrodes to maintain displacement of said electrode surfaces from said mutual alignment.

12. A waveguide laser as claimed in claim 11, wherein a direction of laser light travel is defined in said gas discharge space during operation of said laser, and wherein said spacer has an extent in a direction transverse to said direction of laser light travel of no more than 10% of a width of said gas discharge space.

13. A waveguide laser as claimed in claim 12, wherein said spacer has an extent transverse to said direction of laser light travel of no more than 2% than said width of said gas discharge space.

14. A waveguide laser as claimed in claim 11, wherein said spacer is of a material that is transmissive to laser emissions of said laser.

15. A waveguide laser as claimed in claim 14, wherein said laser is a $CO_2$ laser, and said spacer is of a material that is transmissive to laser emission of a wavelength of approximately 10.6 $\mu$m.

16. A waveguide laser as claimed in claim 11, wherein said first and second electrodes each define a recess about said spacer so that said electrodes surfaces are spaced from said spacer.

17. A waveguide laser as claimed in claim 11, wherein said spacer is in a center of said electrode surface of each of said first and second electrodes.

* * * * *